United States Patent [19]
Haggans et al.

[11] Patent Number: 5,852,690
[45] Date of Patent: Dec. 22, 1998

[54] DEPRESSED CLADDING FIBER DESIGN FOR REDUCING COUPLING TO CLADDING MODES IN FIBER GRATINGS

[75] Inventors: Charles W. Haggans; Wayne F. Varner, both of Woodbury, Minn.

[73] Assignee: Minnesota Mining and Manufacturing Company, St. Paul, Minn.

[21] Appl. No.: 884,889

[22] Filed: Jun. 30, 1997

[51] Int. Cl.$^6$ .................................................... G02B 6/34
[52] U.S. Cl. ............................................ 385/37; 385/127
[58] Field of Search .............................. 385/37; 123/126, 123/127, 123

[56] References Cited

U.S. PATENT DOCUMENTS

| | | | |
|---|---|---|---|
| 4,229,070 | 10/1980 | Olshansky et al. .................. | 350/96.31 |
| 4,230,396 | 10/1980 | Olshansky et al. .................. | 350/96.31 |
| 4,749,248 | 6/1988 | Aberson et al. . | |
| 5,032,001 | 7/1991 | Shang . | |
| 5,559,907 | 9/1996 | Inniss et al. . | |
| 5,615,008 | 3/1997 | Stachelek .................................. | 385/37 |
| 5,757,540 | 5/1998 | Judkins et al. ............................ | 385/37 |

FOREIGN PATENT DOCUMENTS

| | | | |
|---|---|---|---|
| 2 027 224 | 2/1980 | United Kingdom ............. | G02B 5/14 |
| 2 298 287 | 2/1995 | United Kingdom ............. | G02B 6/16 |

OTHER PUBLICATIONS

Photorefractive Gratings in Optical Fibres by J. Archambault, Thesis submitted for Doctor of Philosophy, Univ. of Southampton Dept. of Electronics and Computer Science, Nov. 1994.

Optical Fiber Design for Strong Gratings . . . , by Delevaque et al., Optical Fiber Communications, OFC Post Conference Edition, 1994, PD5–1.

Optical Fibers with Depressed Claddings for Suppression . . . by L. Dong et al., IEEE Photonics Technology Letters, vol. 9, No. 1, Jan. 1997, p. 64.

Radiation–Mode Coupling Loss in Tilted Fiber Phase Gratings by T. Erdogan et al., Optics Letters, vol. 20, No. 18, Sep. 15, 1995, p. 1838.

Bragg Gratings with Efficient and Wavelenth–Selective Fiber Out–Coupling, by Fonjallaz et al., Journal of Lightwave Technology, vol. 15, No. 2, Feb. 1997, p. 371.

Coupling Characteristics of Photo–Induced Bragg Gratings . . . , by Hewlett et al., Optical and Quantum Electronics 28 (1996) p. 1641.

Cladding–Mode Resonances in Bragg Fibre Gratings: Depressed–. . . , by Hewlett et al., Photosensitivity Conference, Sep. 9–11, 1995, 1995 Technical Digest Series, vol. 22, p. PMC2–1/235.

Cladding–Mode Coupling Characteristics of Bragg Gratings . . . by Hewlett et al., Electronics Letters, vol. 31, No. 10, 11$^{th}$ May 1995, p. 820.

Atomic Force Microscopy Study of UV–Induced Anisotropy . . . by Inniss et al., Appl. Phys. Lett 65 (12), 19 Sep. 1994.

Wideband Gain Flattened Erbium Fibre . . . by R. Kashyap et al., Electronics Letters, 21$^{st}$ Jan. 1993, vol. 29, No. 2, p. 154.

(List continued on next page.)

*Primary Examiner*—Hung N. Ngo
*Attorney, Agent, or Firm*—Nestor F. Ho

[57] ABSTRACT

A waveguide, such as an optical fiber waveguide for guiding light waves, which can provide a strongly reflective grating (e.g., a Bragg grating) at a specified wavelength while maintaining very low losses at adjacent wavelengths. The waveguide includes a core, an inner cladding laterally surrounding the core, an outer cladding laterally surrounding the inner cladding, and a grating pattern. The core has a refractive index $n_{co}$ and a first transverse dimension 2A. The inner cladding has a width W and a refractive index $n_{ic}$. The outer cladding has a refractive index $n_{oc}$. The relation between the refractive indexes, $n_{co} > n_{oc} > n_{ic}$ and $0.5 < A/(A+W) < 1$, define a narrow depressed well region for limiting cladding losses.

22 Claims, 10 Drawing Sheets

OTHER PUBLICATIONS

Efficient Fiber Gratings Formed on High NA Dispersion–Shifted Fiber . . . by Komukai et al., Jpn. J. Appl. Phys., vol. 34 (1995) part 2, No. 10A, 1 Oct. 1995, pp. L 1286–L 1287.

Single–Excimer–Pulse writing of Fiber Gratings . . . by Malo et al., Optics Letters, Aug. 1, 1993, vol. 18, No. 15, p. 1277.

Optical Properties of Photosensitive Fiber Phase Gratings by Mizrahi et al., Journal of Lightwave Technology, vol. 11, No. 10, Oct. 1993, p. 1513.

Mode–Coupling Characteristics of UV–Written Bragg Gratings . . . by Morey et al., Electronics Letters, $28^{th}$ Apr. 1994, vol. 30, No. 9, p. 730.

UV–Induced Fiber Grating OADM Devices . . . by Strasser et al., Conference on Optical Fiber Communications '96, Post Deadline Papers, Feb. 29, 1996, vol. 6, p. PD8–2.

Reflective–mode conversion with UV–induced Phase Gratings . . . by Strasser et al., OFC '97, 1997 OSA Technical Digest Series, vol. 6, Friday Morning, FB3, p. 348.

| FIBER DESIGN | IDENTIFIER | Δn+ | Δn- | A (μm) | W (μm) | B (μm) | MFD @ 1550 nm | LP CUTOFF WAVELENGTH (nm) |
|---|---|---|---|---|---|---|---|---|
| MATCHED NON-PHOTOSENSITIVE CLADDING | SMF-28 | ~.0046 | N/A | 4.15 | N/A | 62.5 | 10.5±1.0 | <1260 |
| MODERATELY WIDE DEPRESSED CLADDING | TF-24 | .0038 | .0064 | 5.86 | 3.85 | 62.5 | 9.5 | 1280 |
| NARROW DEPRESSED CLADDING | TF-31A | .0052 | .0059 | 4.65 | 0.75 | 62.5 | 9.85 | 1210 |

DEPRESSED CLADDING FIBER DESIGN FOR REDUCING COUPLING TO CLADDING MODES IN FIBER GRATINGS

BACKGROUND OF THE INVENTION

1. Field of the Invention

The present invention relates generally to a waveguide, such as an optical fiber, for reducing coupling to cladding and or radiation modes in waveguide gratings. More specifically, the waveguide of the present invention includes a depressed cladding design that allows for reduction of losses due to a reduction of coupling to cladding modes.

2. Description of Related Art

An optical fiber waveguide typically includes a core region of refractive index $n_{co}$. Some newer fiber designs surround the core region with an inner cladding having a refractive index $n_{ic}$, which is in turn surrounded by an outer cladding region having a refractive index $n_{oc}$. The outer cladding likewise is surrounded by an external medium having a refractive index $n_{ext}$.

The free parameters in such double cladding waveguide designs usually are:

MFD operational mode field diameter (defined below)

λ operational wavelength

A core radius generated from a single effective step approximation of the core region W inner cladding width generated from a single effective step approximation of the inner cladding region B outer cladding radius $n_{co}$ core refractive index generated from a single effective step approximation of the core region $n_{ic}$ inner cladding refractive index generated from a single step approximation of the inner cladding region $n_{oc}$ outer cladding refractive index $n_{ext}$ next external medium refractive index The term "grating tilt" is defined as the physical tilt of the grating vector (the direction normal to the planes which define the grating periodicity) away from the longitudinal axis of the fiber.

The term "fundamental rejection notch" is defined to be the feature (dip) in the transmission spectrum of the waveguide grating with the smallest value. Generally, this corresponds to the wavelength for which a reduction in the transmitted signal is desired.

The term "cladding mode losses" refers to losses (dips) in the observed transmission spectrum for a waveguide containing a grating that occur due to coupling of the forward propagating modes of the fiber to counter-propagating bound cladding modes (in the case of $n_{ext}<n_{oc}$), or counter-propagating radiation modes (in the case of $n_{ext}>=n_{oc}$). Peak cladding mode loss ("PCML") is the maximum "cladding mode loss" in a given transmission spectrum for a waveguide containing a grating.

Gratings in a fiber are periodic or pseudo-periodic variations in the fiber. Gratings may be formed, for example, by physically impressing a modulation on the fiber, by causing a variation of the refractive index of the fiber using the photoelastic or photorefractive effect, or by other methods known in the art. Gratings, such as optical fiber Bragg gratings, play important roles in telecommunications and sensor applications as wavelength-selective reflectors and filters.

One exemplary method for achieving fiber gratings is to add germanium to the silica glass of a region of the fiber, making the refractive index of that region of the optical fiber susceptible to increase upon exposure to UV radiation. An interference pattern is then formed by UV laser radiation (using an exposure method, such as a phase mask) to create an optical fiber grating. Other methods for achieving structures serving the same mode-coupling function as Bragg gratings are known in the art.

One particular example of the utility of Bragg gratings is in wavelength division multiplexing (WDM) and dense wavelength division multiplexing (DWDM) telecommunications systems, where several channels of information, each at a slightly different wavelength, are carried in the same optical fiber. Optical fiber Bragg gratings are used, for example, to separate the channels at the receiving end by reflecting one wavelength into a separate optical path while allowing all of the other wavelengths to continue onward through the original fiber.

Two important considerations in WDM and DWDM systems are crosstalk and channel differentiation. The ability to minimize losses of light at any of the desired channel wavelengths, and to minimize "crosstalk"—that is, the reflection of small amounts of light from other channels into the path designated for the detector circuit of one specific channel—are important considerations in Bragg grating design.

Currently available optical fiber Bragg gratings typically exhibit losses in transmission at wavelengths other than the desired reflection wavelength. Strong Bragg gratings written in standard telecommunication fibers (e.g., Coming, Inc. SMF-28™) generally exhibit such losses in transmission for wavelengths shorter than the wavelength of the fundamental loss band. These losses are attributed in large part to coupling of light from the guided core mode to backward-propagating "cladding modes" (for fibers where the external refractive index is less than the cladding index) or to backward-propagating "radiation modes" (for external refractive index equal to or greater than the cladding index) when light reflects from a Bragg grating. Light coupled into one of these modes represents a loss of light at that wavelength, since light in these cladding or radiation modes is typically absorbed or lost out the side of the optical fiber after traveling a short distance.

The mode-coupling characteristics of a fiber containing a Bragg grating can be quantified through the use of the normalized coupling coefficient:

$$NCC_{Lm} = NCC_{Lm,L'm'} = \frac{|I_{L'm',Lm}|}{|I_{L'm',L'm'}|}$$

with $$I_{L'm',Lm} = \int_0^{2\pi} \int_0^{R_{grating}} \psi^*_{L'm'}(r,\phi)\psi_{Lm}(r,\phi)f(r,\phi)rdrd\phi$$

and $$I_{L'm',L'm'} = \int_0^{2\pi} \int_0^{R_{grating}} \psi^*_{L'm'}(r,\phi)\psi_{L'm'}(r,\phi)rdrd\phi$$

where f(r,φ) contains the functional dependence of grating azimuthal (φ) and radial (r) asymmetries and the $\psi_{L'm'}(r,\phi)$ and $\psi_{Lm}(r\phi)$ are the normalized LP (linearly polarized) solutions for the transverse field distribution in a weakly guiding fiber for the core and cladding modes of interest, respectively. These field distributions are obtained from the solution of Maxwell's equations for a fiber utilizing approaches well known to those skilled in the art and integration is performed over the transverse extent of the grating.

Undesirable losses in highly reflective fiber Bragg gratings due to coupling to bound cladding modes or lossy radiation modes are well documented. Several approaches have been proposed for reducing this coupling, including strongly confining the core mode in a single-mode fiber, strongly confining the core mode in a multi-mode fiber, fibers with equally photosensitive core and cladding regions, and, recently, fibers with wide depressed cladding regions. As an example, Dong, et al. (IEEE Photonics Technology Letters, Vol. 9, No. 1, January 1997, 64–66), have argued that coupling to both the lowest order symmetric (L=0) and asymmetric (L=1) cladding modes can be reduced, although not eliminated, by providing an optical fiber which has a wide depressed inner cladding structure immediately adjacent to a high refractive index core, thus creating an index profile wide depressed well having a lower refractive index than the remainder of the fiber. (see, e.g., Dong, FIGS. 3–5)

Each of these approaches has some drawbacks. Strongly confining the core mode in a single-mode fiber by increasing the core refractive index gives a smaller mode-field diameter than a moderately confined conventional single-mode fiber. A smaller MFD value leads to larger losses when splicing to standard single-mode fiber. Strongly confining the core mode in a multi-mode fiber has the potential for higher splicing losses for multi-mode to single-mode fiber coupling. Enabling low-loss coupling of these multi-mode fibers to conventional single-mode fibers requires additional processing steps and leads to a more complicated device. For example, the use of high numerical aperture (high confinement) fibers may cause mode-field mismatch losses when splicing to conventional single-mode telecommunication fibers operated at 1550 nm (e.g., Coming, Inc. SMF-28™) without special fiber and device constructions.

Fibers with equally photosensitive core and cladding regions or fibers with wide depressed cladding regions, although beneficial for reducing cladding mode coupling losses in gratings with negligible variation of the photoinduced index transverse to the fiber axis, have reduced effectiveness for gratings having azimuthal asymmetries.

The process of writing gratings typically generates azimuthal asymmetry due to writing from the side, even if the asymmetry due to tilt of the normal to the planes of peak modulation of the grating with respect to the fiber longitudinal axis ("grating tilt" or "blaze") is essentially eliminated. (See, e.g., U.S. Pat. No. 5,559,907, Inniss, et al.). The side-writing asymmetry is due in part to the fact that, in a fiber with a strongly absorbing core, some of the incoming light beam used to write the grating is absorbed as it first enters the near side of the core, so there is less light in the beam to be absorbed when the beam reaches the far side of the core.

Both fibers with photosensitive core and cladding regions and fibers with wide depressed cladding regions can exhibit strong out of band losses for azimuthally asymmetric gratings. The performance of these fibers for non-azimuthally symmetric transverse photoinduced index distributions is not optimal due to the resultant strong coupling to asymmetric cladding modes. Specifically, asymmetry in strong gratings is known to give added short-wavelength losses. While it may be possible to develop gratings having no azimuthal asymmetries, in practice, most gratings include small tilts of the grating fringe planes which are usually introduced during fabrication due to interference fringe-to-fiber misalignment. Additionally, it has been shown that strong azimuthal asymmetries in the transverse photoinduced index profile can occur in Type I and Type II gratings due to the sidewriting process. Although significant efforts have been directed to approaches for reducing asymmetry in the manufacturing process (see e.g., Inniss, et al. and Baker, et al. GB 2298287), a need remains for a fiber that reduces cladding mode coupling losses in gratings having azimuthal asymmetries.

SUMMARY OF THE INVENTION

The present invention is a waveguide, such as an optical fiber waveguide for guiding light waves, which can provide a strongly reflective grating (e.g., a Bragg grating) at a specified wavelength while maintaining very low losses at adjacent wavelengths. The waveguide of the present invention may be used, for example, for DWDM telecommunications applications. The present invention reduces losses in the presence of small grating tilt and grating side-writing-induced asymmetries that typically accompany present grating writing methods, while at the same time having an MFD which minimizes splicing loss when the fiber is coupled to standard telecommunications fibers.

The optical waveguide of the present invention includes a photosensitive core having a refractive index $n_{co}$ and a first transverse dimension 2A. An inner cladding laterally surrounds the core, the inner cladding having a width W and a refractive index $n_{ic}$. In turn, an outer cladding laterally surrounds the inner cladding, the outer cladding having a refractive index $n_{oc}$. In the present waveguide, $n_{co}$ has a larger value than $n_{oc}$, which has a larger value than $n_{ic}$. The waveguide of the present invention includes a narrow depression well, defined as a well where 0<W<A, C=A/(A+W) and 0.5<C<1.

In a preferred embodiment, the waveguide is a single mode optical fiber fiber including a core having a fundamental wavelength in the range of 1500 to 1600 mn, and having a refractive index $n_{co}$ and a first transverse dimension 2A, where A is in the range of 3–7 μm. An inner cladding laterally surrounds the core, the inner cladding having a width W in the range of 0.1 to 2.5 μm and a refractive index $n_{ic}$. An outer cladding, having a refractive index $n_{oc}$ in the range of 1.4–1.6, laterally surrounds the inner cladding. $n_{co}>n_{oc}>n_{ic}$ and 0.5<A/(A+W)<1, defining a narrow depressed well. The difference between $n_{oc}$, and $n_{ic}$ is in the range of 0.003 to 0.012 and the difference between $n_{co}$ and $n_{oc}$, is in the range of 0.003 to 0.010. The outer cladding has a radius of B and B is in the range of 30–250 μm. The fiber includes a grating pattern, such as a Bragg grating.

In another embodiment, the waveguide includes a single mode optical waveguide having a core having a fundamental wavelength in the range of 900–1000 nm. The core has a refractive index $n_{co}$ and a first transverse dimension 2A, where A is in the range of 2.0–4.5 μm. An inner cladding laterally surrounds the core, the inner cladding having a width W in the range of 0.06 to 1.67 μm and a refractive index $n_{ic}$. An outer cladding laterally surrounds the inner cladding, the outer cladding having a refractive index $n_{oc}$ in the range of 1.4–1.6. $n_{co}>n_{oc}>n_{ic}$ and 0.5<A/(A+W)<1. As with the previous embodiment, the difference of $n_{oc}$ and $n_{ic}$ is in the range of 0.003 to 0.012 and the difference of $n_{co}$ and $n_{oc}$ is in the range of 0.003 to 0.010. The outer cladding has a radius of B in the range of 30–250 μm. The waveguide also includes a grating pattern, such as a Bragg grating.

In yet another embodiment, C is in the range from 0.6 to 0.98. In another particular embodiment, the waveguide is a single mode waveguide having at least one Bragg grating pattern and A/(A+W) is in the range from 0.7 to 0.95. In another particular embodiment, the difference between $n_{oc}$ and $n_{ic}$ is in the range from 0.003 to 0.012. The specific value of W is determined using the analysis approach detailed below.

In relation to standard single-mode fibers, the waveguide of the present design improves short wavelength loss for small nonzero values of asymmetry, e.g., the value range as determined using the analysis approach detailed below from 0.25 to 1.5 degrees of tilt, which appear in present grating processes.

DETAILED DESCRIPTION OF THE INVENTION

Figure 1:
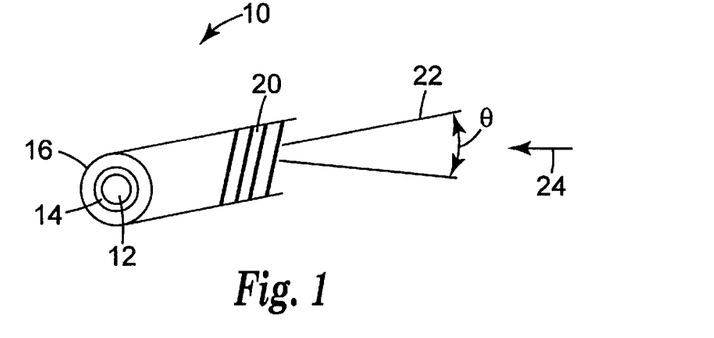
FIG. 1 is an isometric view of a cross-sectional cut of a waveguide in accordance with the present invention.

The present invention is directed to a waveguide, such as an optical fiber. FIG. 1 illustrates an embodiment of an optical fiber 10 in accordance with the present invention. The optical fiber 10 is a single-mode uncoated optical fiber having a cylindrical cross-section. It is to be understood that other embodiments of the present invention may include multi-mode fibers, fibers with coatings, and fibers having different cross-sectional geometries known in the art.

The optical fiber 10 includes a core 12 having a first transverse dimension or diameter 2A and being comprised of a material having a refractive index $n_{co}$. Laterally surrounding the core 12 is an inner cladding 14 having and a width W, an inner cladding or barrier radius AB (where AB=A+W) and a refractive index $n_{ic}$. An outer cladding 16, having a refractive index $n_{oc}$, laterally surrounds the inner cladding 14.

The particular fiber 10 illustrated in FIG. 1 has a photosensitive core and includes one Bragg grating pattern 20. Due to the grating manufacturing process, the fiber 10 includes a grating process azimuthal asymmetry. The fiber 10 has an optical axis 22 and an actual grating tilt 24.

Figure 2:
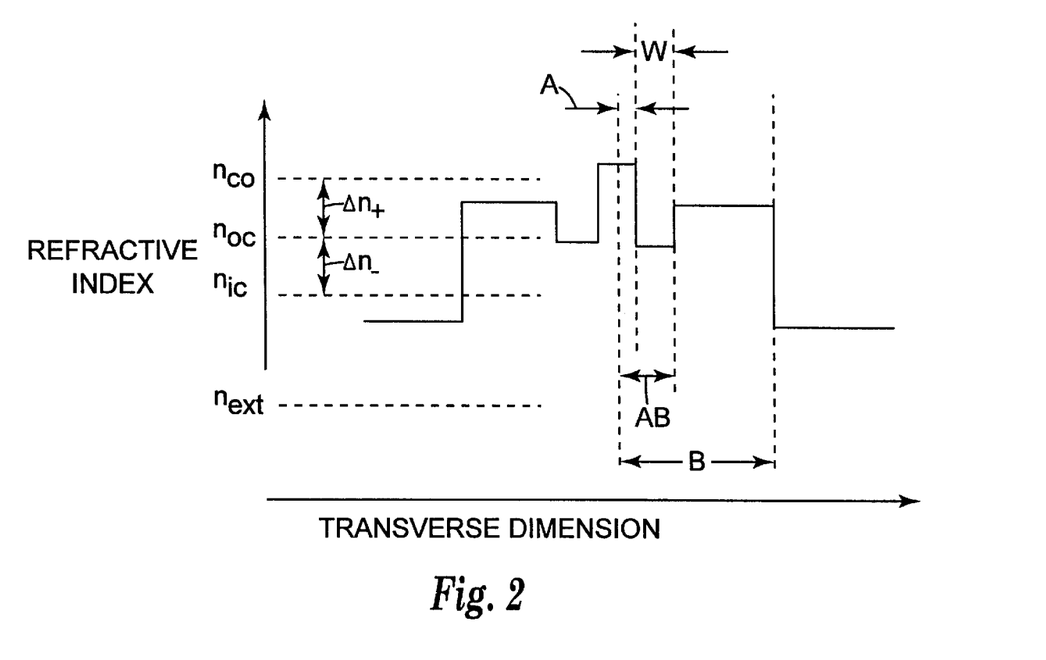
FIG. 2 is a graph depicting a refractive index profile along the diameter of the uncoated optical fiber, illustrated in FIG. 1, having a depressed inner cladding.

FIG. 2 graphically illustrates the refractive index profile along the diameter of the optical fiber 10, illustrated in FIG. 1. The refractive index of the air or other external medium or cladding surrounding the optical fiber is denoted as $n_{ext}$. It must be understood that FIG. 2 is merely a graphical representation which simplifies the n value boundaries as discrete and instantaneous. Techniques for obtaining such discrete and instantaneous boundaries are referred to as "effective step index" approximations, and are well known in the art for approximating more complicated refractive index profiles.

Unlike a typical matched cladding fiber, the optical fiber 10 has a depressed inner cladding configuration. As can be appreciated from FIG. 2, for fiber 10 the refractive index of the core $n_{co}$ has a greater absolute value than the refractive index of the outer cladding $n_{oc}$. In turn, the refractive index of the outer cladding has a greater absolute value than the refractive index of the inner cladding $n_{ic}$. Accordingly, $$n_{co} > n_{oc} > n_{ic}$$

The difference between $n_{co}$ and $n_{ic}$ creates a refractive index profile depressed well of width W and of depth Δn−, where Δn−=$n_{oc}$−$n_{ic}$. The difference between $n_{co}$ and $n_{oc}$ is defined as Δn+. The total height of the core refractive index profile, Δn, equals $n_{co}$−$n_{ic}$=Δn−+Δn+.

According to the established theory, moving to a wider depressed well would further reduce cladding mode losses. Previous researchers had conducted their analysis based on minimizing the NCC (sometimes referred to as the normalized overlap integral, NOI) between the guided core mode and the first nine cladding modes, using typical telecommunications wavelengths in the range of 1550 nm. Based on this criteria, Bragg grating fiber performance was expected to continue to improve for symmetric cladding modes as the width of the depressed well increases. Nonetheless, losses to the higher radial order asymmetric cladding modes (e.g., $LP_{19}$) appear to reach a minimum for depressed well thicknesses around 12 microns, then begin to rise rapidly. These results suggested that the overall minimum loss would be achieved with a fiber having a depressed well thickness in the range of 12–16 microns, the equivalent to a ratio of core radius to (core radius+depressed well width) in the range of 0.2.

However, the transmission spectrum of optical fibers with a wide depressed clad (wide well), such as that depicted in FIGS. 6a–10, show a significant increase in loss at certain wavelengths. The increase is due to light from the fundamental mode being coupled out into cladding modes (primarily the $LP_{11}$ hybrid core mode).

In contrast to the prior art advocating wide wells, the waveguide of the present invention includes a "narrow well" inner cladding configuration. The ratio C of the core radius A to the barrier radius AB can be defined by C=A/AB=A/(A+W). In embodiments of the present invention, 0.5<A/AB.

The present invention describes how, in general, reduction of cladding mode coupling can be obtained for core radius (A) to depressed inner cladding radius (AB) ratios (C) of C>0.5 and moderate index depressions (~0.003<Δn_<~0.012) due to the balancing of two effects.

One, for this fiber geometry range, the $LP_{11}$ hybrid mode field distribution does not strongly duplicate the field distribution of a core $LP_{11}$ mode. The lack of strong duplication limits the strength of the allowed asymmetric mode coupling (principally the $LP_{1m}$ mode set for small grating asymmetries).

Two, the presence of the inner depressed clad changes the boundary conditions that must be satisfied by the $LP_{0m}$ cladding mode set at the inner and outer boundaries of the narrow inner depressed clad, reducing the cladding mode field amplitude in the core region as compared to the cladding mode field amplitude in a matched-cladding fiber of the same mode-field diameter. The field modification or "field pinning condition" is due to the presence of a layer of material with a different refractive index with dimension of the same order of magnitude as the wavelength of light times the refractive index of the medium. Thus, coupling to the $LP_{0m}$ mode set is reduced compared to the matched clad fiber.

In the present embodiment, C is in the range of 0.60 to 0.98 for a moderate barrier index depression $\Delta n$, illustrated in FIG. 2. In another particular embodiment, C is in the range from 0.7 to 0.95.

Figure 3:
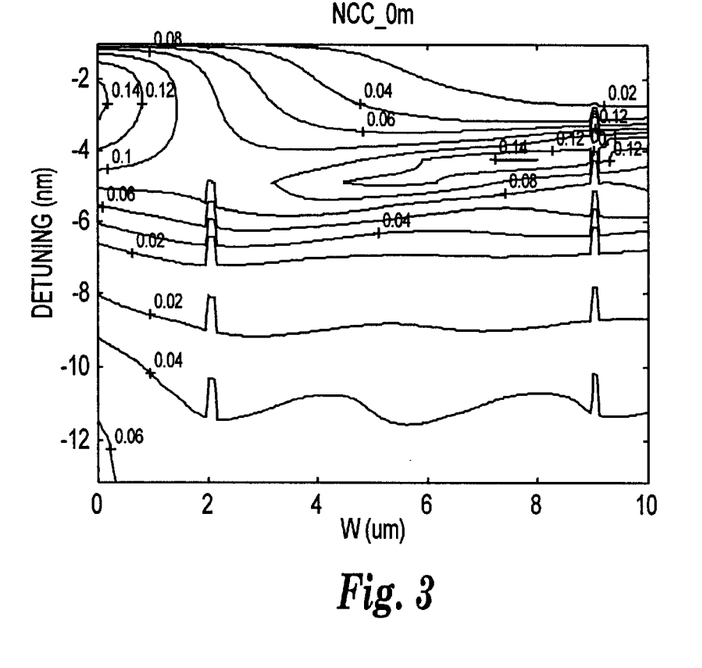
FIGS. 3 is a contour plot of $NCC_{0m}$ versus detuning from the fundamental wavelength and the depressed inner cladding region width, W.
Figure 4:
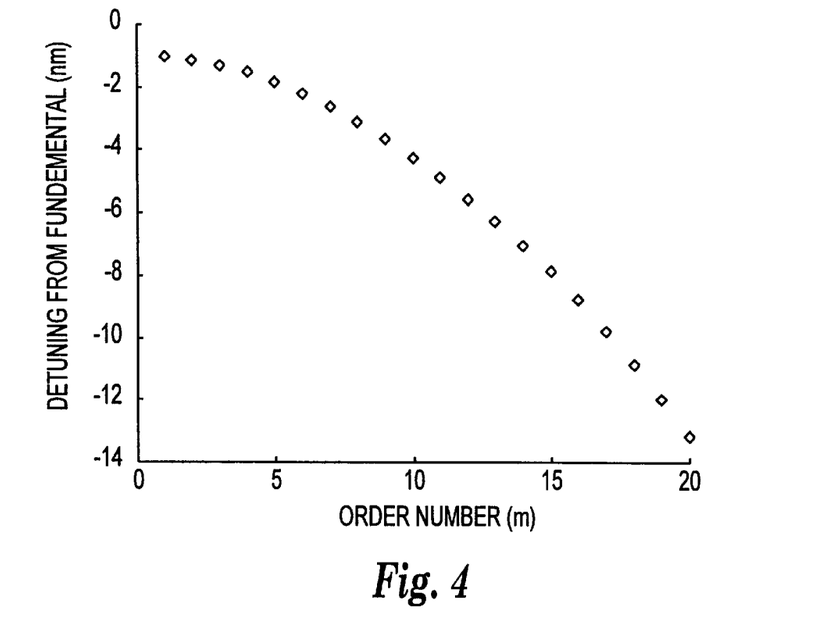
FIG. 4 is a plot of the correlation between radial mode number (m) and detuning for FIG. 3.

A narrow depressed clad fiber in accordance with the present invention can be analyzed using FIG. 3, which is a contour plot that represents the discrete W-dependent $NCC_{0m}$ values with respect to the detuning of a particular cladding mode resonance from the $LP_{0l}$–$LP_{0l}$ resonance (coupling maximum) as the barrier width (W) is increased for one grating azimuthal asymmetry condition ($\theta=0.5°$). FIG. 4 is a plot that relates the discrete radial mode number, m, to a particular detuning value.

$\theta$ is defined as the effective tilt of the normal to the grating fringe planes within the fiber with respect to the fiber longitudinal axis. The term "effective grating tilt" is defined as the value of "grating tilt" that is shown experimentally to give cladding-mode loss equivalent to the cladding-mode loss when an azimuthal asymmetry is present in a grating inscribed in the waveguide. The equivalence is determined experimentally through matching a measured transmission spectrum of minimum fundamental transmission −XdB for a grating with no physical tilt of the grating fringes that is generated in the preferred method that exhibits azimuthal asymmetry to a measured transmission spectrum of minimum fundamental transmission −Ydb for a grating containing an intentionally introduced fringe plane tilt, $\theta$, with X=Y.

The detuning was calculated using the mode effective indices ($n_{eff,L'm'}$ and $n_{eff,Lm}$) (as obtained from the solutions of Maxwell's equations for the fiber geometry of interest as well known by those skilled in the art), the grating period $\Lambda$, and $\theta$ by substituting into:

$$\text{Detuning}(Lm) = \frac{\Lambda}{\cos\theta} (n_{eff,L'm'} - n_{eff,Lm})$$

FIG. 3 illustrates the $NCC_{0m}$ coefficients versus barrier width and detuning for $\theta=0.5°$. Discontinuities visible on some contours for W values ≅2 and 9 μm are a consequence of the representation of the discrete $NCC_{0m}$ values in a continuous fashion. FIG. 4 illustrates the correlation between mode number (m) and detuning. Fiber and grating parameters are $\lambda=1550$ nm, $\Delta n_-=0.005$, $\Delta n_+=0.0046$, $n_{oc}=1.4446$, $n_{ext}=1.0$, B=62.5 μm, A=5 μm.

The peak L=0 fundamental mode-cladding mode coupling for a particular fiber geometry occurs for the cladding mode (m) having the largest value of $NCC_{0m}$. In FIG. 3, the barrier width (W) which has the lowest peak $NCC_{0m}$ is ~2.25 μm,. At this local minimum in L=0 cladding mode coupling, which is near the narrow barrier fiber design of the present embodiment, L=1 mode coupling has not yet reached a maximum. The region of minimum $NCC_{0m}$ is defined as the "saddle point" region for the contour plot illustrated in FIG. 3. For comparison, note that a barrier width of 0 (left side of plots) corresponds to a conventional matched cladding design (SMF-28), while a barrier width of 10 (right side of plots) corresponds to a fiber representative of a wide depressed cladding design. Since the maximum $NCC_{0m}$ is greater for the wide barrier design than for the present invention's narrow barrier design, the design gives reduced coupling for this degree of grating asymmetry.

The design region of the present invention (the saddle point region of NCC as a function of inner cladding width in FIG. 3) is contrary to previous teachings indicating that a wide, deeply depressed inner cladding barrier region is preferred, (the right side of FIG. 3). By including an effective grating tilt explicitly into the NCC integration, the present invention determines that there is a preferred region in effective grating tilt for which a narrow depressed well inner cladding gives an improvement over conventional approaches. The origin of this saddle point, modification of field strength through the presence of a narrow depressed inner cladding is unexpected from the prior art.

As is well known by those familiar with the art, propagation in waveguides can be computationally simulated. In particular, a property of the $LP_{Lm}$ mode in a multimode waveguide containing a "grating" is known as the normalized coupling coefficient ($NCC_{Lm}$). This parameter can be calculated based on the azimuthal and radial asymmetry of the photoinduced grating that is to be written in the fiber, the normalized LP (linearly polarized) solutions for the transverse field distribution in the waveguide for the core and cladding modes of interest $\psi_{L'm'}(r,\phi)$ and $\psi_{Lm}(r,\phi)$ (as obtained from the solution of Maxwell's equations for a waveguide utilizing approaches well known to those skilled in the art (see, e.g., A. W. Snyder and J. D. Love, *Optical Wavegide Theory*, Chapter 13 (Chapman and Hall, London: 1983); and Michel Monerie, Propagation in Doubly clad Single Mode Fibers, IEEE Journal of Quantum Electronics, Vol. QE-18, No. 4, April 1982). Note that while use of a waveguide which is not technically "weakly guiding" due to a difference between two of the waveguide refractive indices ($\Delta n=nx-ny$) that does not meet the weakly guiding approximation of $\Delta n<<1$, we find this method to be useful for determining the general range of choice for W. The $NCC_{1m}$ is defined as follows, where, for demonstration purposes only, we have chosen the desired core mode to be the $LP_{10}$ mode.

$$NCC_{Lm} = \frac{|I_{01,Lm}|}{|I_{01,01}|}$$

with $$I_{01,Lm} = \int_0^{2\pi}\int_0^{R_{grating}} \psi^*_{01}(r,\phi)\psi_{Lm}(r,\phi)f(r,\phi)rdrd\phi$$

and $$I_{01,01} = \int_0^{2\pi}\int_0^{R_{grating}} \psi^*_{01}(r,\phi)\psi_{01}(r,\phi)rdrd\phi$$

where $f(r\phi)$ contains the functional dependence of grating azimuthal and radial asynmmetries. Utilizing the "effective grating tilt" approach defined above, $f(r,\phi)$ has the form:

$$\exp\left(-i\frac{2\pi}{\Lambda}\sin\theta r\cos\phi\right)$$

Thus, $I_{01,Lm}$ reduces to $$I_{01,Lm} = \int_0^{2\pi}\int_0^{R_{grating}} \psi^*_{01}(r)\psi_{Lm}(r,\phi)\exp\left(-i\frac{2\pi}{\Lambda}\sin\theta r\cos\phi\right)rdrd\phi$$

A first step in designing a waveguide in accordance with the present invention is to decide on the preferred values of $\lambda$ and MFD. The "operating wavelength" is defined as the wavelength in the transmission spectrum at which the "fundamental rejection notch" for gratings written in this waveguide is to occur. MFD is the value of the mode field diameter desired for the waveguide at the "operating wavelength." This value may be affected by the mode field diameter of the waveguide system to which a device built in accordance with the present invention will be coupled.

Once these two design parameters are selected, the outer cladding refractive index ($n_{oc}$) is chosen as desired from available materials at the operating wavelength. The outer cladding radius (B) is chosen as desired for the particular application with the requirement that B exceeds A+W by an amount sufficient to allow the existence of at least one bound symmetric (L=0) and one bound asymmetric (L=1) cladding mode in the waveguide structure for the case of $n_{ext}$=1.0. Those skilled in the art will be familiar with the procedure for determining the dimensional limits for the existence of the allowed modes.

Although the waveguide may be recoated with a mode-matching or mode-stripping outer coating after fabrication, making the cladding modes leaky, for the present analysis, $n_{ext}$ is chosen to be less than $n_{oc}$ by an amount that enables either (a) m=20 bound $LP_{0m}$ and $LP_{1m}$ cladding modes to exist in the waveguide at the operating wavelength for the situation where >20 bound $LP_{0m}$ and $LP_{1m}$ cladding modes exist in the waveguide; or (b) all bound $LP_{0m}$ and $LP_{1m}$ cladding that exist in the waveguide for $n_{ext}$=1.0 to still be bound for the case that <20 bound LP0m and LP1m cladding modes exist in the waveguide.

Using well-known equations, $n_{co}$ and A then are chosen to give at least one bound core mode. Similarly, $n_{ic}$ is chosen from available refractive index values to give at least one bound core mode.

Next, a general range for W is determined for the waveguide for a given θ. To visualize the general region of W of this invention, $NCC_{0m}$ values are calculated as a function of W for W ranging from 0 to 2A, or to the value of W where the fundamental mode ceases to be bound in the core of the waveguide, in increments not more than 0.04A. This computation will be made retaining either:

(a) m=1 to 20 bound $LP_{0m}$ cladding modes at the operating wavelength in the case that >20 bound $LP_{0m}$ cladding modes exist in the waveguide; or (b) all bound $LP_{0m}$ cladding that exist in the waveguide for the case that <20 bound $LP_{0m}$ cladding modes exist in the waveguide.

The $NCC_{0m}$ values so obtained are plotted in a contour plot representation utilizing a commonly available plotting package such as MATLAB from The Mathworks, Inc. from Natick, Mass., with the W values along the x axis and the detuning of the $LP_{Lm}$ resonance from the fundamental resonance of interest $LP_{Lm}'$, along the y axis is defined as $$\text{Detuning}(Lm) = \frac{\Lambda}{\cos\theta}(n_{eff,L'm'} - n_{eff,Lm})$$

where LPL'm' can, for example, be $LP_{0l}$, the forward propagating core mode, A is the grating periodicity in the direction normal to the grating planes of the grating, and $n_{eff,L'm'}$ and $n_{eff,Lm}$ are the effective indices for the corresponding LP modes, obtained through the well known techniques for solution of Maxwell's equations in waveguides.

Those skilled in the art will recognize the presence of a "saddle point" in the contour plot of NCC0m values. As discussed above, an example of such saddle point is shown in FIG. 3 at a detuning of approximately −4.5 nm and a depressed inner clad width of 2.25 μm. The general range of choice for W generally contains the minimum of the saddle region.

Determining the preferred region of W requires computational solution of mathematical expressions that are commonly referred to as the "coupled-mode equations". These differential equations govern the transfer of power between allowed bound modes in a waveguide due to the periodic perturbation of the waveguide provided by the grating. Solution of these equations can be used to determine the power coupled into or out of an individual mode due to the presence of the grating. The mathematical basis for the simulation process is well understood by those familiar with the art, and has been detailed by, for example, J. L. Archambault, PhD. thesis, University of Southampton, Chapter 2 (1994).

A simulation of the type detailed above is utilized to calculate the signal transmitted through the waveguide containing the grating as a function of wavelength (this signal versus wavelength plot commonly being called a "transmission spectrum"). The grating input parameters used in this simulation are the effective tilt angle θ, a grating period A satisfying the phase matching condition for the fundamental loss peak:

$$\lambda_{fundamental} = \frac{\Lambda}{\cos\theta}(n_{eff,L'm'} + n_{eff,Lm})$$

and an arbitrarily chosen grating length (L) and peak-to-peak photoinduced grating refractive index (Δn) such that the minimum intensity transmission coefficient in the fundamental rejection notch is less than −17.5 dB (T (dB)= 10log 10(T(absolute))). The simulated spectra shown in FIGS. 9 and 10 have characteristics of gratings meeting these requirements. Note that when comparison are made between the spectra for two waveguide designs, the minimum transmission coefficients are identical.

The peak cladding mode loss (PCML) was defined above as the maximum cladding mode loss that is visible in a given transmission spectrum.

The mode field diameter (MFD) of a mode propagating in a waveguide can be defined as (using the $LP_{0l}$ mode as an example)

$$MFD = 2\sqrt{2}\left[\frac{\int_0^\infty |\psi_{01}|^2 r\, dr}{\int_0^\infty \left(\frac{d\psi_{01}}{dr}\right)^2 r\, dr}\right]^{\frac{1}{2}}$$

The core confinement factor (η) is defined (using the $LP_{01}$ mode as an example)

$$\eta = \frac{|I_{01,01}|}{F}$$

$$\text{with } \frac{1}{F} = \frac{1}{2}\left(\frac{8.85E-12}{4\pi E-7}\right)^{\frac{1}{2}} n_{co}$$

For a particular application, a preferred value of W for a waveguide in accordance with the present invention may be defined by comparison to a "reference" matched clad waveguide having a grating, identical MFD, identical basic parameters and W=0 and A chosen appropriately to give the matching MFD.

The difference in peak cladding mode loss between the waveguide of the present invention and the "reference" waveguide, $$\Delta PCML = PCML_{this\ invention} - PCML_{reference}$$

is used to define a preferred value of W. For example, for the spectrum of FIG. 9a, a matched clad fiber containing a grating, the PCML =−1.2 dB. FIG. 9c is an example spectrum for the narrow depressed clad waveguide of this invention, with PCML=−0.6 dB. Using FIG. 9a as the spectrum for the reference waveguide and FIG. 9c as the spectrum for a waveguide in accordance with the present invention, ΔPCML=0.6 dB.

To ensure the accuracy of the computational approach used to generate the PCML and ΔPCML values, waveguides meeting the prescription developed by the computational method are fabricated, gratings are written in the fibers, and the PCML values are experimentally determined. The performance range is defined by these experimental measurements, to ensure that unforeseen inaccuracies in the simulation approach do not give inaccurate limits for this invention.

A preferred W value for the waveguide of this invention is the value of W under the conditions defined by the preceding analysis for which ΔPCML is maximized, defined as ΔPCML_preferred.

Under the conditions defined by the preceding analysis, a preferred range of W is the range of W for which ΔPCML_preferred>ΔPCML>K*PCML_reference, where 1>W>0.5 A currently preferred value of K is 0.5. If no value of ΔPCML as a function of W falls within these limits for a given θ, there is no preferred solution for this θ value.

The present exemplary embodiment of fiber 10 is a cylindrical optical fiber designed for having a fundamental wavelength in the range of 1500 to 1600 nm, a core radius A in the range of 3–7 µm, a width W in the range of 0.1 to 2.5 µm, an outer cladding index $n_{oc}$ in the range of 1.4 to 1.6, a Δn− in the range of 0.003–0.012, a Δn+ between 0.003–0.010, θ in the range 0.25° to 1.5° and a value of B between 30–250 82 m. While the figures in the present application illustrate an embodiment of the present invention for a specified value of "operating wavelength", λ, those skilled in the art will be able to appreciate that the design parameters of the present invention may be applied in designing waveguides for other desired values of λ, MFD, and/or θ.

The values of variables such as A, W, Δn−, Δn+ in other embodiments may vary depending on the value of C, λ, and/or other design parameters. For example, another exemplary embodiment for a single -mode fiber having λ=980 nm and θ in the range 0.25 to 1.5 degrees, has n2≅1.4–1.6, W≅0.06 to 1.67 µm, A≅2.0–4.5 µm, Δn−≅0.003–0.012, Δn+≅0.003–0.010, and B≅30–250 µm.

Figure 5:
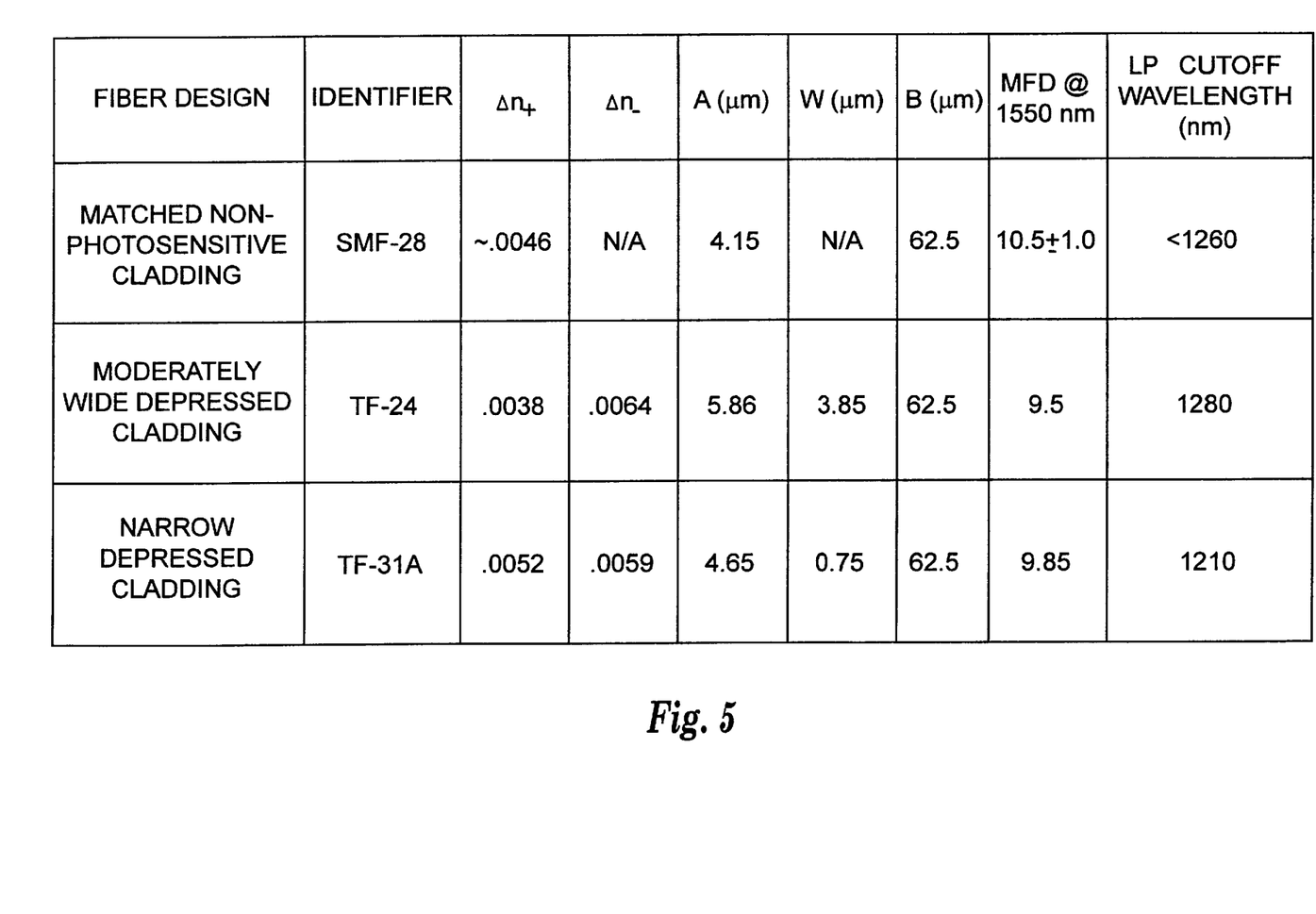
FIG. 5 is a comparison table for three Bragg grating optical fiber designs.
Figure 6A:
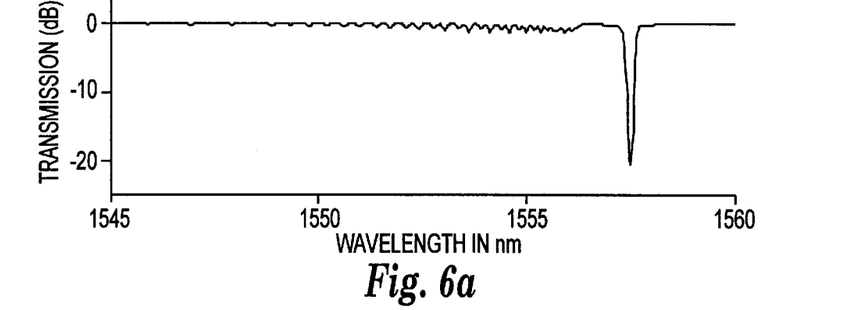
FIGS. 6a–d are experimental and simulated comparison graphical plots of transmission spectra for the first optical fiber design listed in the table in FIG. 5 with a grating tilt angle ≈1.0 degrees.
Figure 6B:
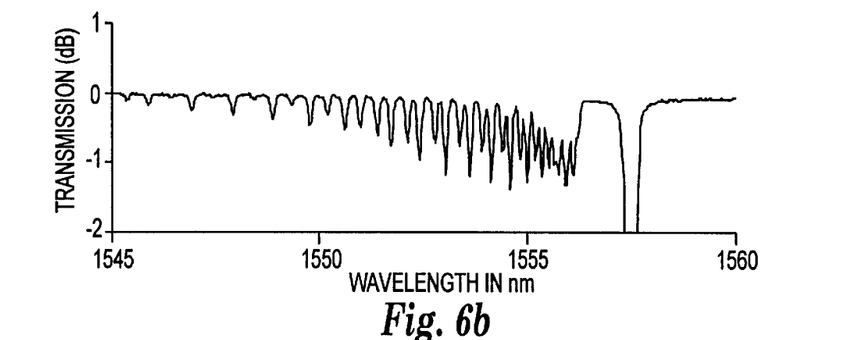
Figure 6C:
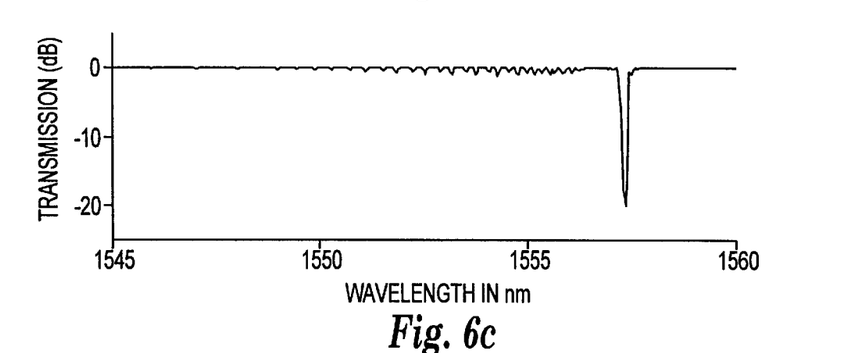
Figure 6D:
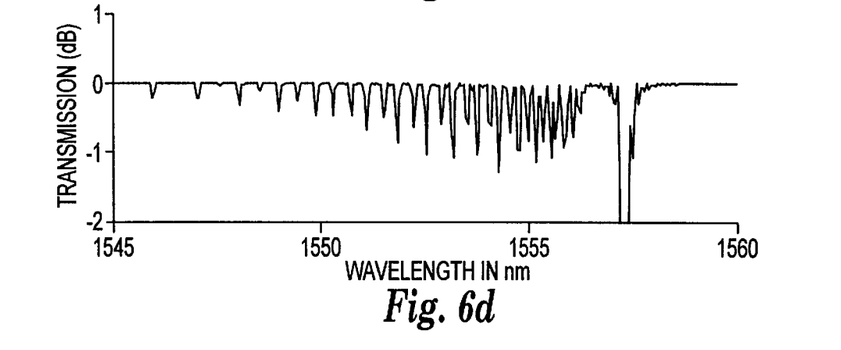
Figure 7A:
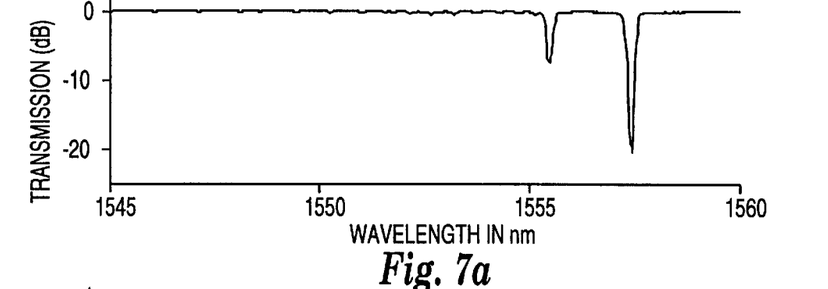
FIGS. 7a–d are experimental and simulated comparison graphical plots of transmission spectra for the second optical fiber design listed in the table in FIG. 5 with a grating tilt angle ≈1.0 degrees.
Figure 7B:
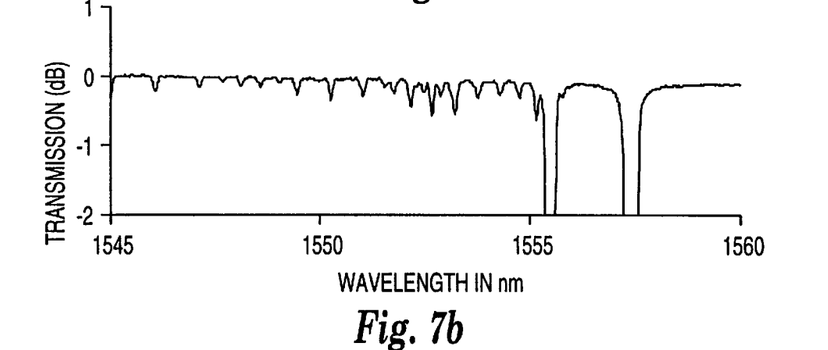
Figure 7C:
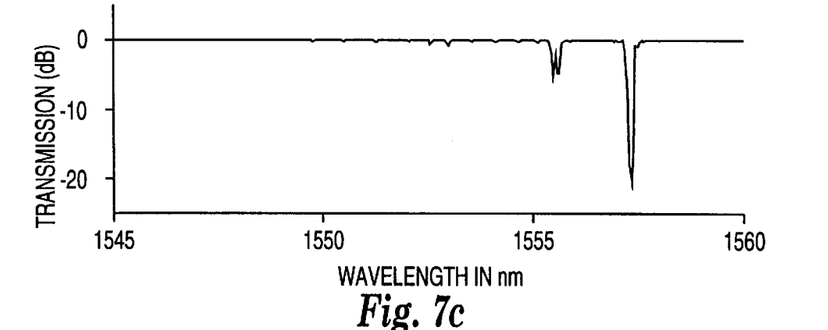
Figure 7D:
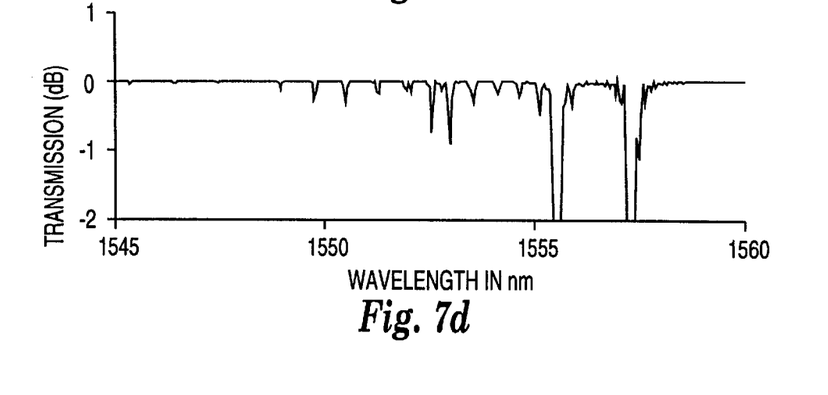
Figure 8A:
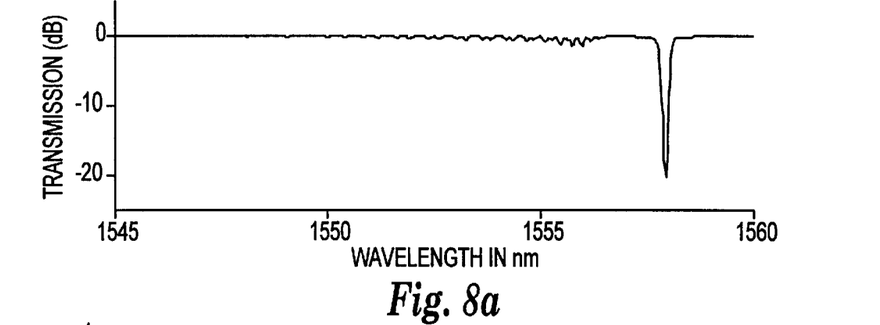
FIGS. 8a–d are experimental and simulated comparison graphical plots of transmission spectra for the third optical fiber design listed in the table in FIG. 5 with a grating tilt angle ≈1.0 degrees.
Figure 8B:
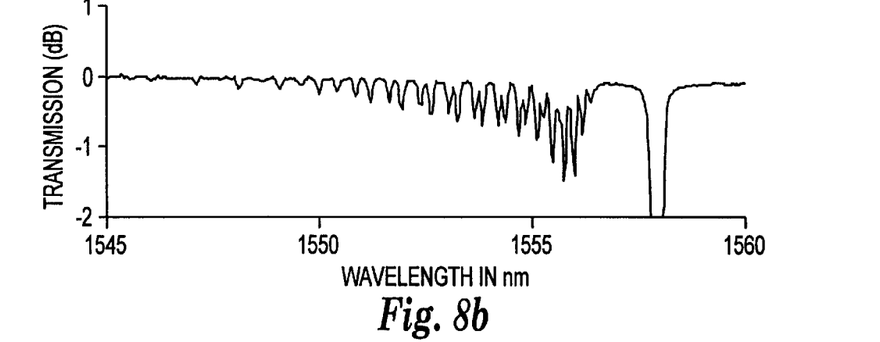
Figure 8C:
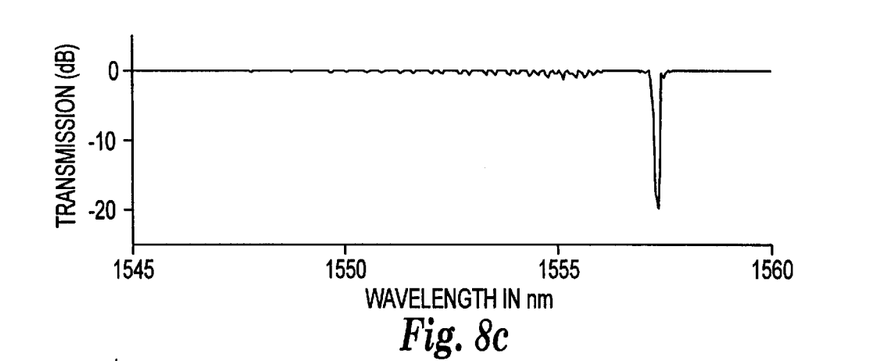
Figure 8D:
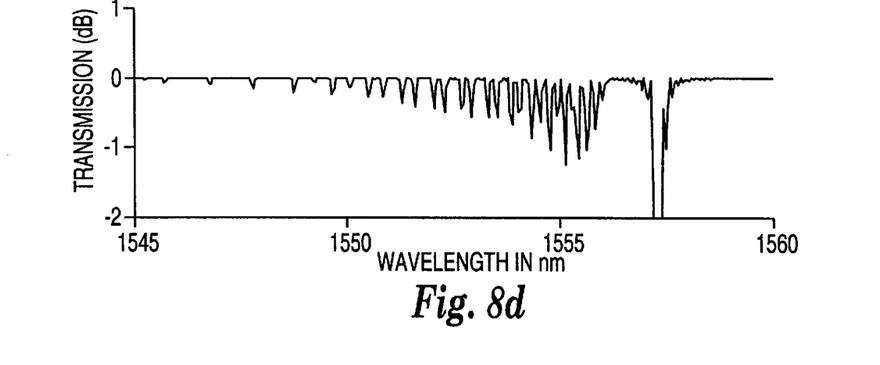

The table in FIG. 5 shows a comparison of three Bragg grating optical fiber designs, all having a target MFD of 10.5±1 at 1550 nm, to attempt to minimize splicing losses when coupling these fibers to standard telecommunications fibers. It must be understood that the parameters and results illustrated in FIGS. 5–10 are experimental and simulation values used solely for exemplary purposes and are not an attempt to define or characterize the prior art.

The first of the fibers listed in FIG. 5, SMF-28, is a commercially available single mode fiber from Corning, Inc., Corning, N.Y. SMF-28 fiber is frequently used for making optical fiber Bragg gratings for telecommunications applications where a MFD match with standard telecommunications fibers is required. The second fiber is a single-mode dual cladding fiber having a wide depressed well (inner cladding) structure. The third fiber is an exemplary embodiment of the present invention having a narrow depressed well (inner cladding) where C≅0.84.

FIGS. 6–8 depict graphical representations of an experimentally measured and a computer simulation derived transmission spectrum for each of the three optical fiber designs listed in the table in FIG. 5.

The experimental spectra, shown in two different scales in FIGS. 6a–b, 7a–b, and 8a–b, were measured for fibers manufactured with a strong grating having a physical tilt of approximately 1°. Each spectra was measured experimentally for a value of $n_{ext}$≅1.

FIGS. 6c–d, 7c–d, and 8c–d show computer simulated transmission spectra, again in two scales, corresponding to the fibers listed in FIG. 5. In generating these plots, a grating tilt of 1.2 degrees was used, to verify agreement, within the experimental error range, with the experimentally measured results. These plots were generated using a coupled-mode simulation. The grating simulated was 10 mm in length and unapodized with a peak-to-peak photoinduced index modulation of ~0.00044 (the exact index modulation value was adjusted to give equal peak rejection for each fiber).

Figure 9A:
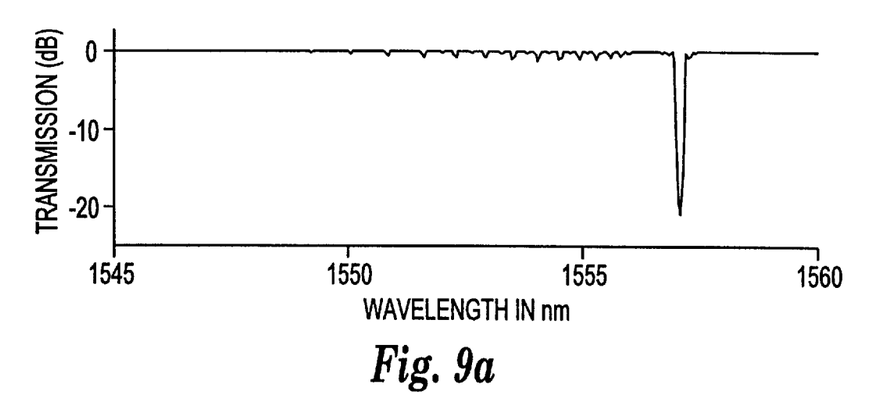
FIGS. 9a–d are comparison graphical plots of modeled transmission spectra for the three optical fiber designs listed in the table in FIG. 5 with a grating tilt angle ≈0.6 degrees.
Figure 9B:
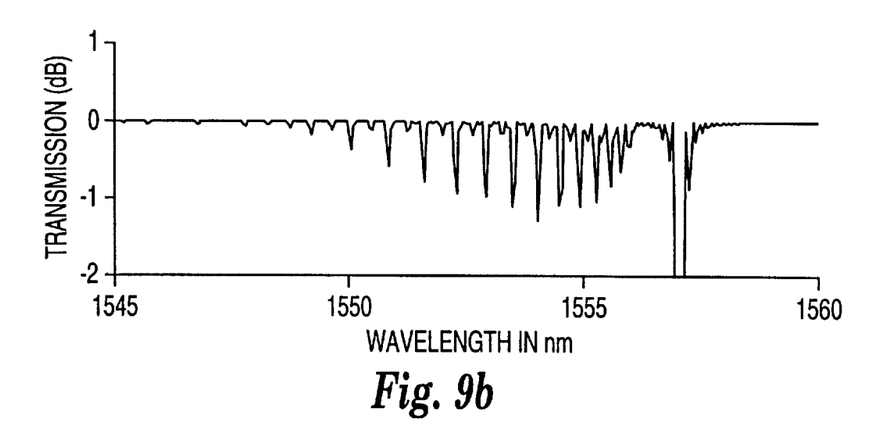
Figure 9C:
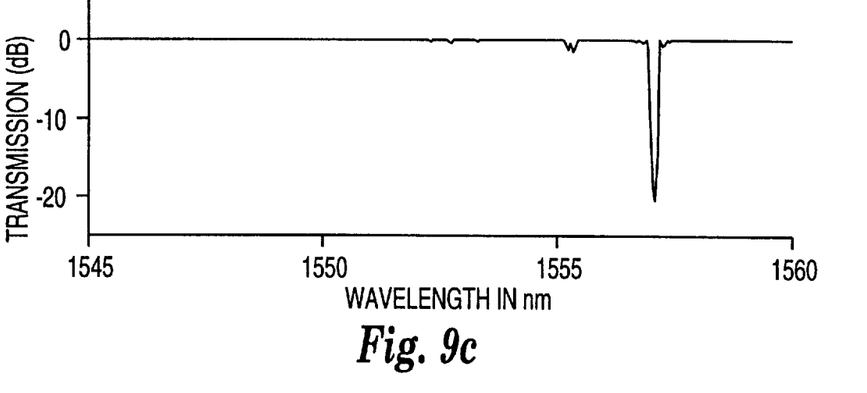
Figure 9D:
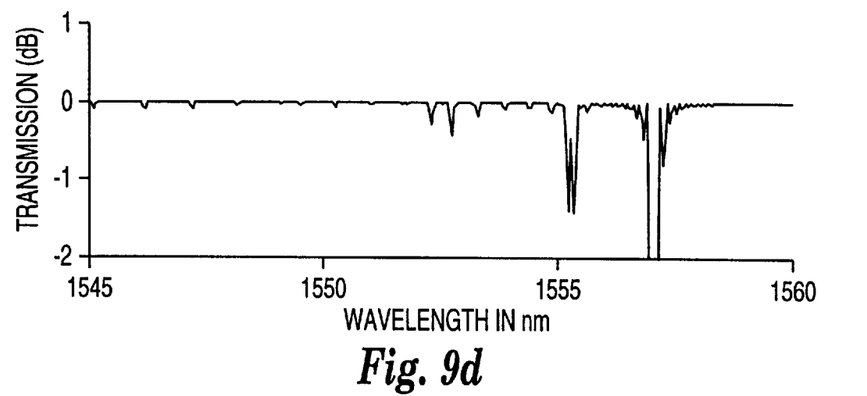
Figure 10A:
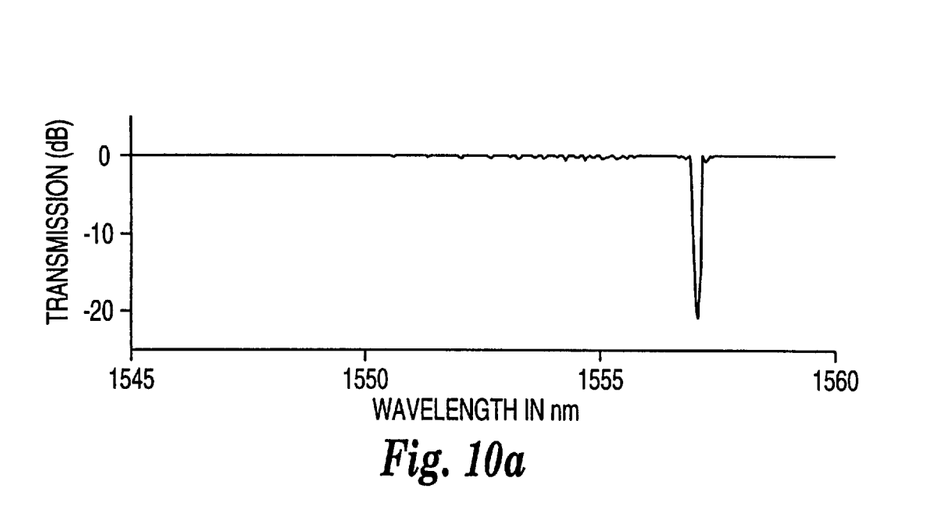
FIG. 10 is a comparison graphical plot of the modeled transmission spectrum for a matched photosensitive core and inner cladding optical fiber design having a grating tilt angle ≈0.6 degrees.
Figure 10B:
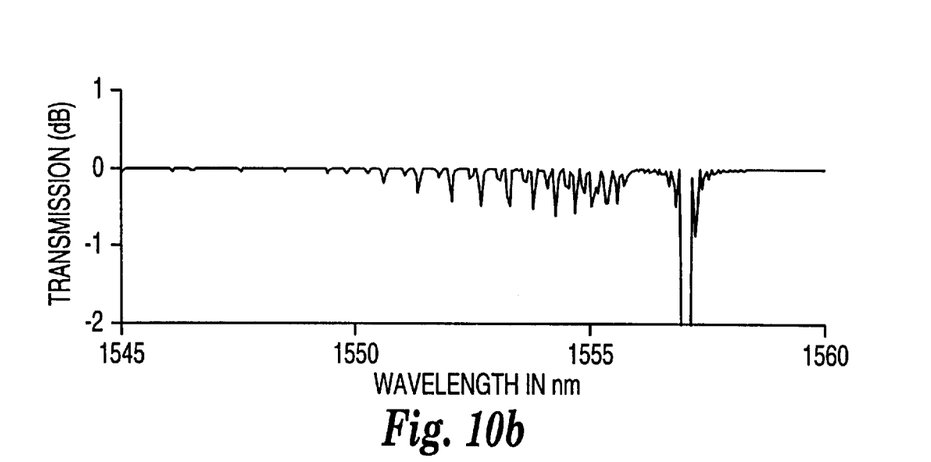
Figure 10C:
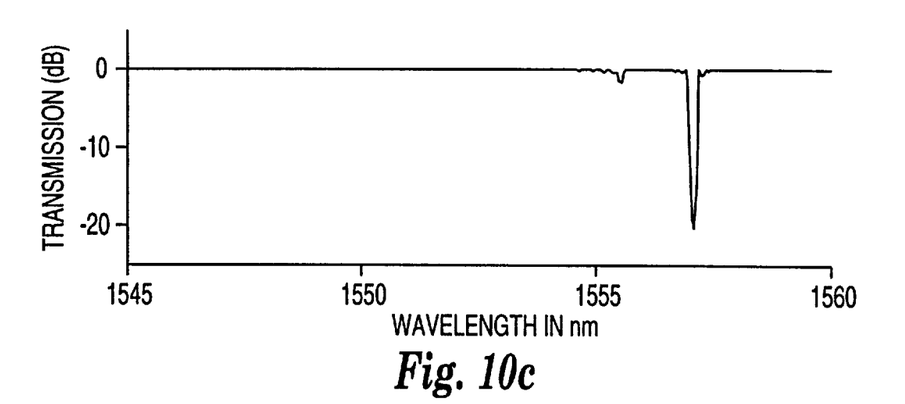
Figure 10D:
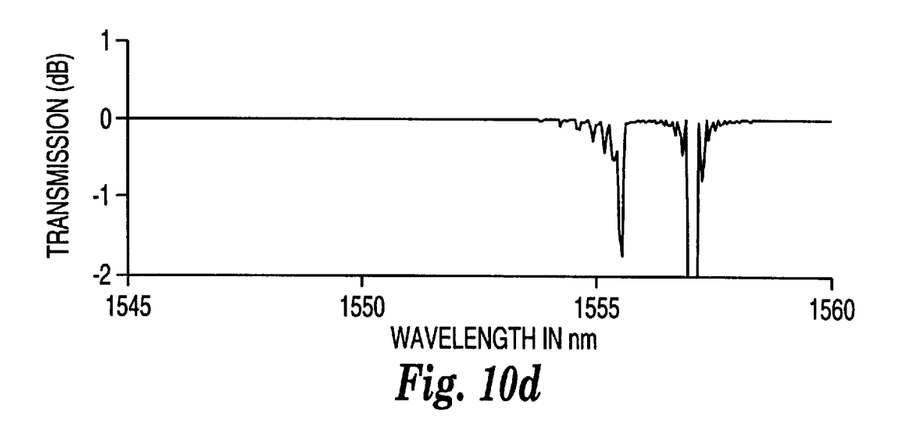

FIGS. 9a–c similarly show computer simulated transmission spectra graphs for the fibers listed in FIG. 5 for a grating tilt ≅0.6 degrees. FIG. 10 shows a transmission spectra graph for yet another type of fiber, a matched photosensitivity design. Those skilled in the art will appreciate that the spectrum graphs in FIGS. 6–10 show that the design of the present invention generally results in a reduction in the loss peaks at wavelengths near the fundamental reflection peak. Those skilled in the art also will note that the cladding mode losses are minimized in the proposed narrow well design. Both the experimental and computer simulated data in FIGS. 6–10 indicate that in the presence of the moderate tilt or asymmetry which results from typical manufacturing processes, the cladding mode loss is reduced for the narrow depressed clad design of the present invention.

FIGS. 6–10 illustrate that for small values of grating tilt or asymmetry, the narrow depressed cladding fiber design of the present invention gives improved suppression over wide depressed clad designs for non-ideal grating writing conditions. At the same time, the present invention is an improvement over the conventional matched cladding design (SMF-28) because of the reduced coupling to the $LP_{0m}$ mode set. The present invention furthermore is an improvement over SMF-28-like matched-photosensitivity design due to a significant reduction in coupling to the $LP_{1m}$ mode set.

What is claimed is:

1. An waveguide for guiding electromagnetic waves, the waveguide comprising:
    a) a core having a refractive index $n_{co}$ and a first transverse dimension 2A;
    b) an inner cladding laterally surrounding the core, the inner cladding having a width W and a refractive index $n_{ic}$;
    c) an outer cladding laterally surrounding the inner cladding, the outer cladding having a refractive index $n_{oc}$;
    d) a grating pattern; and
    e) a narrow depressed well, wherein $n_{co}$>$n_{oc}$>$n_{ic}$ and 0.5<A/(A+W) <1.

2. The waveguide of claim 1, wherein the waveguide is a single mode waveguide.

3. The waveguide of claim 1, wherein the core includes a photosensitive material.

4. The waveguide of claim 1 wherein A/(A+W) is in the range from 0.7 to 0.95.

5. The waveguide of claim 1, wherein the grating comprises at least one Bragg grating pattern.

6. The waveguide of claim 3, wherein the grating comprises at least one Bragg grating pattern.

7. The waveguide of claim 1, further comprising a grating process asymmetry.

8. The waveguide of claim 1 wherein said waveguide is a single mode optical fiber having an optical axis and an actual grating tilt in the range of 0.25 to 1.5 degrees.

9. The waveguide of claim 7 wherein said waveguide is a single mode optical fiber having an optical axis and an actual grating tilt in the range of 0.25 to 1.5 degrees.

10. The waveguide of claim 1 wherein the difference between $n_{oc}$ and $n_{ic}$ is in the range from 0.003 to 0.012.

11. The waveguide of claim 7 wherein the difference between $n_{oc}$ and $n_{ic}$ is in the range from 0.003 to 0.012.

12. A single mode optical waveguide for guiding light waves, the waveguide comprising:
- a) a core having a fundamental wavelength in the range of 1500 to 1600 nm, and having a refractive index $n_{co}$ and a first transverse dimension 2A, where A is in the range of 3–7 µm;
- b) an inner cladding laterally surrounding the core, the inner cladding having a width W in the range of 0.1 to 2.5 µm and a refractive index $n_{ic}$;
- c) an outer cladding laterally surrounding the inner cladding, the outer cladding having a refractive index $n_{oc}$ in the range of 1.4–1.6; and
- d) a narrow depressed well, wherein $n_{co} > n_{oc} > n_{ic}$ and $0.5 < A/(A+W) < 1$.

13. The optical waveguide of claim 12, wherein the difference between $n_{oc}$ and $n_{ic}$ is in the range of 0.003 to 0.012.

14. The optical waveguide of claim 13, wherein the difference between $n_{co}$ and $n_{oc}$ is in the range of 0.003 to 0.010.

15. The optical waveguide of claim 12, wherein the outer cladding has a radius of B and B is in the range of 30–250 µm.

16. The optical waveguide of claim 12, further comprising a grating pattern.

17. A single mode optical waveguide for guiding light waves, the waveguide comprising:
- a) a core having a fundamental wavelength in the range of 900–1000 nm, and having a refractive index $n_{co}$ and a first transverse dimension 2A, where A is in the range of 2.0–4.5 µm;
- b) an inner cladding laterally surrounding the core, the inner cladding having a width W in the range of 0.06 to 1.67 µm and a refractive index $n_{ic}$;
- c) an outer cladding laterally surrounding the inner cladding, the outer cladding having a refractive index $n_{oc}$ in the range of 1.4–1.6; and
- d) a narrow depressed well, wherein $n_{co} > n_{oc} > n_{ic}$ and $0.5 < A/(A+W) < 1$.

18. The optical waveguide of claim 17, wherein the difference between $n_{oc}$ and $n_{ic}$ is in the range of 0.003 to 0.012.

19. The optical waveguide of claim 18, wherein the difference between $n_{co}$ and $n_{oc}$ is in the range of 0.003 to 0.010.

20. The optical waveguide of claim 17, wherein the outer cladding has a radius of B and B is in the range of 30–250 µm.

21. The optical waveguide of claim 17, further comprising a grating pattern.

22. The waveguide of claim 1, wherein the value of $$\frac{A}{A+W}$$

is selected such that the peak cladding mode loss PCML of the waveguide is minimized.

* * * * *

UNITED STATES PATENT AND TRADEMARK OFFICE
CERTIFICATE OF CORRECTION

PATENT NO.: 5,852,690
DATED: December 22, 1998
INVENTOR(S): Charles W. Haggans and Wayne F. Varner It is certified that errors appear in the above-identified patent and that said Letters Patent is hereby corrected as shown below:

Col. 11, Line 23: "where 1>W>0.5" should read -- where $1 > \frac{A}{A+W} > 0.5.$ --.

Signed and Sealed this

First Day of June, 1999

Q. TODD DICKINSON

*Attest:*

*Attesting Officer*     *Acting Commissioner of Patents and Trademarks*